United States Patent [19]

Yamamoto

[11] Patent Number: 5,510,133
[45] Date of Patent: Apr. 23, 1996

[54] PROCESS FOR PREPARING FOODSTUFFS BASED ON REFORMED AND CURED HERRING ROE

[75] Inventor: Shoji Yamamoto, Sherwood, Canada

[73] Assignee: Keeping and MacKay Limited (K. & M.), Canada

[21] Appl. No.: 344,678

[22] Filed: Nov. 21, 1994

[51] Int. Cl.$^6$ ..................................... A23L 1/328
[52] U.S. Cl. ..................... 426/272; 426/92; 426/274; 426/643
[58] Field of Search .................... 426/643, 274, 426/513, 272, 418, 92

[56] References Cited

U.S. PATENT DOCUMENTS

| | | |
|---|---|---|
| 7,895 | 1/1851 | Westacott . |
| 3,914,422 | 10/1975 | Chen .......................... 426/643 |
| 4,181,739 | 1/1980 | Santo ......................... 426/272 |
| 4,399,161 | 8/1983 | Nakamura et al. ......... 426/643 |
| 4,477,476 | 10/1984 | Kagawa et al. ............. 426/643 |
| 4,670,276 | 6/1987 | Nakajima .................... 426/274 |
| 5,225,232 | 7/1993 | Jyumi ......................... 426/643 |
| 5,415,886 | 5/1995 | Wakameda et al. ........ 426/643 |
| 5,464,648 | 11/1995 | Nishijima ................... 426/643 |

FOREIGN PATENT DOCUMENTS

| | | | |
|---|---|---|---|
| 7134734 | 10/1971 | Japan ........................ 426/643 |
| 58-179465 | 10/1983 | Japan ........................ 426/643 |
| 62-220173 | 9/1987 | Japan ........................ 426/643 |
| 2-268664 | 11/1990 | Japan ........................ 426/643 |
| 421159 | 8/1974 | U.S.S.R. ................... 426/643 |

Primary Examiner—Arthur L. Corbin
Attorney, Agent, or Firm—Nath & Associates; Gary M. Nath; Suet M. Chong

[57] ABSTRACT

A process is provided herein for producing a variety of reformed and cured herring roe mixed foods including "herring roe on kelp", "herring roe on shellfish" and "herring roe with kamaboko" by making the best use of the intrinsic binding ability of fresh herring eggs. In one embodiment, the process may begin by extracting ovaries from sexually-matured herring. Individual eggs are then singled out from the ovaries. The eggs are rinsed and cleaned. A perforate mold is then filled in single or multi-layers with any solid food or foods, e.g., kelp, fish, shell-fish, kamaboko, ham, sausage and/or cheese between the layers of eggs, to form a sandwich structure. The sandwich structure in the mold is then salt-cured, substantially to the saturation level. The salt-cured and solidified product is then removed from the mold.

18 Claims, No Drawings

PROCESS FOR PREPARING FOODSTUFFS BASED ON REFORMED AND CURED HERRING ROE

BACKGROUND OF THE INVENTION (i) Field of the Invention

The present invention relates to a process for preparing foodstuffs based on reformed and cured herring roe and to the foodstuffs so prepared.

(ii) Description of the Prior Art

Among the herring roe products are "herring roe on kelp", "herring roe on shellfish", and "herring roe with kamaboko". Salt-cured herring roe, otherwise known to the Japanese as "kazunoko", or "shio-kazunoko", is commercially produced either of perfectly-formed ovaries, or of broken pieces of ovaries. The ovaries consist of many individual eggs. High quality kazunoko, which is highly valued by the Japanese as a delicacy, is manufactured from the ovaries of Pacific Ocean herring, especially from the herring caught in waters near British Columbia, Canada, because the individual eggs are very cohesive in binding, very crunchy in eating texture and large in size. Pacific herring ovaries of low grades, and almost all Atlantic herring ovaries have not been used heretofore for manufacturing conventional shio-kazunoko of high quality because of the imperfect shape of ovaries, blood-shot, premature, over-matured or partially spent ovaries, and the low cohesiveness, less crunchiness or small size of their individual eggs. Those characteristics of the ovaries of the eggs lead to unacceptable quality as shio-kazunoko.

Contrary to the conventional product described above, there has been produced, for at least the last two decades, an unconventional product known as "ajitsuke-kazunoko" in Japanese or seasoned kazunoko. This form is usually of the broken pieces of herring ovaries. The seasoned kazunoko, which is currently consumed as a daily food by the Japanese, is prepared through processes of salt-curing, then de-salting and seasoning in various flavors by using the herring ovaries rejected by the conventional kazunoko manufacturing, which include Pacific herring ovaries of lower grades and most or all of Atlantic herring ovaries. However, it is still preferred to use pacific herring ovaries of high grades for the production of seasoned kazunoko in order to produce a high quality product.

Herring roe on kelp consists of spawned and fertilized herring eggs adhered on the fronds of kelp or other edible seaweeds. Roe-laden kelp is commercially harvested from the coastal waters of the North American Pacific Ocean solely for the Japanese export market. To increase the harvest, kelp is often artificially suspended in herring spawning sites, or captive herring is impounded in floating pens within which kelp is suspended inside. The harvested roe on the kelp is subsequently salt-cured, to provide the product "herring roe on kelp", which is called "komochikonbu" in Japanese. Evenly and thickly roe-laden kelp is highly valued in Japan because the primary market is expensive restaurants and year-end gift items. The supply is limited and controlled by quota allocations.

In the Atlantic waters of the Canadian Maritime provinces, Atlantic herring spawns in shallow waters, e.g., banks, where benthic vegetation is often light. Such banks are also not suitable for growing seaweed which is useful for the commercial seaweed market in Japan. The spawned eggs which deposit on the floor of such waters are interweaved with seaweed.

It has previously been proposed to produce the above-identified products from eggs which have been stripped from harvested female herring. In such proposal, the eggs were added to a tank in which sea water was mixed with herring milt (sperm). Kelp fronds were placed at the bottom of the tank, allowing the fertilized eggs to deposit, and subsequently stick to the kelp. However, the carrying out of this proposal was a difficult operation, because it was necessary to harvest a stock of herring to provide the eggs and the milt for such delicate fertilization just hours before their spawning and sperming in water. Furthermore, it was necessary that herring be freshly processed within several hours after harvesting. Otherwise, the eggs, especially those of Atlantic herring, would not cohere together compactly and adhere tightly to kelp, in the same manner as that of the natural Pacific product. It should be noted that the eggs from Atlantic herring are not as adhesive and cohesive as the Pacific counterpart.

Several methods have been reported or patented directed to the manufacture of reformed "kazunoko". Many of those methods used food binders to glue together "barako" (individually separated eggs of "kazunoko"), e.g., alginates, casein, egg white, modified starches and "surimi" (undenatured fish mince protein). The mixture of "barako" and binders was then placed into a mold or casing and was then usually heat-processed to form "kazunoko" of new shapes. The heating undenatured the proteins of the eggs and would change their eating texture.

There are many patented procedures involving the processing of fish roe. U.S. Pat. No. 7,895 dated Jan. 7, 1851 by R. G. Westacott is concerned with an improvement in the manufacture of caviar, wherein caviar was made by placing a layer of ova and a layer of salt in a tub. Pickle and salt solution well poured over the top of the mixture and the ova was permitted to rise or float on the pickle while foreign matter settle to the bottom of the tub. This separated the ova from extraneous matter or impurities. The thus-separated ova was removed from the pickle, and was subjected to a process of producing caviar ready for packing.

U.S. Pat. No. 3,914,422 patented Oct. 21, 1975 by Y. K. Chen provided a process for the preparation of common mullet roe. In the patented process, the ovarian membrane enclosing the roe was first cleaned and dried and then was impregnated with salt, either in brine or dry form. Thereafter, the membrane was encapsulated with an absorbent material composed of cloth or paper to form an envelope which was then placed on a flat horizontal surface and was pressed from above with a further flat surface with sufficient pressure applied to the membrane, to flatten it without rupturing. The pressure was maintained for a sufficient period of time to flatten the membrane to approximately one-half of its original height at an ambient temperature. Upon releasing the pressure on the flattened envelope, the envelope and any other extraneous material was stripped from the membrane and was dried for a period of four to fifteen days at a predetermined ambient humidity as required to achieve a desired moisture content of the membrane and roe.

U.S. Pat. No. 4,181,739 patented Jan. 1, 1980 by Y. Santo provided a process for processing loose herring roe, i.e., to produce "kazunoko". The patented process involved gutting the Atlantic herring to collect their ovaries, and separating the ovaries completely into individual eggs. The loose herring roe (as provided above) was placed in a first container. The roe was soaked in an initial sodium chloride salt solution. The mass of the roe was removed from the first container. The roe was then soaked in two to four additional salt solutions. Finally, the roe was formed into a product of a shape corresponding to the first container by cohesion. The salt solutions had different concentrations of sodium chloride therein ranging from at least 2% in the initial solution to the saturation level in the final solution.

U.S. Pat. No. 4,399,161 patented Aug. 16, 1983 by H. Nakamura et al provided a method for storing processed fish and roe. The patented method included placing processed fish or processed roe in a gas-impermeable packing bag or into an airtight container, together with an oxygen absorbent and leaving it to stand at a temperature between −20° C. and 25° C. The processed fish were obtained by immersing fresh fish in brine, splitting the back or belly, or slicing the fish, and then dewatering the fish.

U.S. Pat. No. 4,477,476 patented Oct. 16, 1984 by T. Kagawa et al provided a method for processing salmon roe products. In the patented method, green salmon roe was salted under agitation in a saturated aqueous solution of salt containing a nitrite and which was free from any precipitates, and was then dehydrated. The thus-salted roe was then immersed under agitation in a saturated aqueous solution of a malate containing a nitrite and which was free from any precipitates. The thus-processed roe was then worked up in a conventional manner.

U.S. Pat. No. 4,670,276 patented Jun. 2, 1987 by S. Nakajima provided a process for producing sandwich-like foods based on surimi. The patented sandwich-like food was produced by heating and drying surimi and then forming the thus treated surimi into first and second continuous sheets. Molten cheese, molten cheese mixed with minced salami, or a raw meat mixture for the manufacture of salami was then ejected onto the sheets and was placed on a first continuous sheet of ground fish meat so as to form a continuous layer. A second continuous sheet of surimi was then superposed thereon. These components were pressed into a sandwich form. The resulting sandwich-like product was then dried and cut into pieces of a size suitable for use as food.

Russian Patent No. 421,159 dated 16.06.72 by Kiniti Iwata described manufacturing herring roe on kelp, which used the intrinsic binding ability of sexually-matured herring eggs, based on the spawning habit of herring. In order to accomplish this, the patentee suggested that the roe (eggs) and soft roe (sperm) which were removed from herring be subjected to the following steps: The ground soft roe were mixed with a brine so as to make a solution of soft roe. A material, e.g., kelp which was cleaned and washed in brine, was placed into a brine containing the roe (eggs) so as to make clusters of eggs adhere to the material. The resulting eggs-covered seaweed were transferred to a container of brine containing ground soft roe, where they were held until each egg was fecundated. Thus, seaweed with eggs were obtained.

The utilization of a brine in this patent was not to effect the dehydration, adhesion and cohesiveness of eggs, but to carry out conditions which were almost the same as those in nature providing adhering to kelp and the fecundation. The soft roe alone functioned as a binder, that is, it enabled eggs to adhere to themselves and to seaweed. In this Russian patent, as noted above, kelp was dipped in a brine suspension of herring eggs and the eggs thus adhered to the kelp by their intrinsic adhesive property. The egg-laden kelp was next dipped in a brine suspension of herring milt (sperm) to harden the eggs. It should be noted that most Atlantic herring eggs do not adhere to kelp easily with this process because of their poor adhesiveness.

Japanese Patent No. 46-34734 dated Jun. 21, 1968 by Eiichi Tabata provided a teaching of consolidating immature herring eggs. This patent was concerned with the preparation of completely solidified ovaries which consisted of collecting the immature ovaries of North Pacific Ocean migratory fish, e.g., herring ovaries, soaking them (without separating them into individual eggs) in a solution of an organic or inorganic acid to swell the ovaries, soaking them in a solution of aluminum chloride, sprinkling with table salt and then stacking them. The taste of the product would be astringent due to the aluminum chloride used.

Japanese Patent Publication No. 102458/1976 described a procedure whereby alginic acid in kelp or "wakame" (Undaria) was extracted out on the frond surface as water soluble alginate. Artificial herring roe on kelp was produced by having "barako" (individually separated eggs of the salt-cured ovaries) adhere to the treated fronds. The "barako" was then immobilized by changing the soluble alginate to insoluble alginic acid or calcium alginate. This type of chemically-treated products will not match the natural product in terms of appearance and eating quality.

SUMMARY OF THE INVENTION (i) Features of the Invention

Thus, it is observed that the prior art did not completely solve the problem of providing a variety of reformed and cured herring roe mixed foods including "herring roe on kelp", "herring roe on shellfish" and "herring roe with kamaboko" by making use of the intrinsic binding ability of fresh herring eggs.

Accordingly, an object of the present invention is to produce, even from herring ovaries of low grades, a new type of "kazunoko" which facilitates new serving methods and enriches eating experiences.

Another object of this invention is to produce, even from herring ovaries of low grades, a new type of "kazunoko" on the basis of the concept that individual eggs obtained from the herring ovaries of lower grades can be converted into a firmly fixed form.

It is a further object of the present invention to produce such food product in a shape corresponding to a mold used, so that it can be eaten by slicing it, or as it is when the shape is small enough, for use in preparing sushi, hors d'oeuvres, seasoned "kazunoko" or "shiokazunoko".

(ii) Statement of Invention

By the present invention, a process is provided for preparing a variety of reformed and cured herring roe mixed foods derived from eggs from herring ovaries, regardless of their grade, solid food, salt and water, which process comprises: filling a perforate mold with sexually-matured herring eggs of any grade, and with selected solid food or foods so as to sandwich the food or foods in single or multi-layers between the layers of eggs or with the mixture of the eggs and the food; subsequently salt curing the eggs and the food or foods to, or close to, the saturated level to provide a salt-cured product; and allowing such salt-cured product to solidify in the perforate mold.

The present invention also provides a reformed and cured herring roe product comprising a solidified molded layered sandwich of sexually-matured herring eggs and selected solid food or foods which have been salt-cured to, or close to, the saturation level, or a solidified molded mixture of sexually-matured herring eggs and selected solid food or foods which have been salt-cured to, or close to, the saturation level.

The present invention also provides a herring roe product comprising a solidified molded product of herring eggs of any grade from any races of sexually-matured herring, which has been salt-cured to, or close to, the saturation level.

(iii) Further Features of the Invention

By one feature thereof, the new type of "kazunoko" of the present invention can be produced from the ovaries of any herring races, which the manufacturers of conventional "shio-kazunoko" have traditionally rejected on the basis of their low quality as an ingredient of "kazunoko".

By another feature thereof, the herring eggs are individual eggs from any races of herring singled-out from the ovary sacs of sexually-matured female herring. By a variation of such feature, the individual eggs are rinsed in sea water, salt solution or fresh water, at a preferred temperature, e.g., one between about 5° C. and about 15° C. By another variation of such feature, the salt water has a concentration of about 3–4% w/w salt. By yet another variation of such feature, the rinsed solution or water is decanted to remove the pieces of ovarian membranes, dissolved blood and other contaminants from the ovaries, and the pieces of coagulated blood, and the ovarian membrane still left is removed to obtain the cleaned eggs.

By another feature thereof, the solid food is processed or unprocessed kelp, shellfish, fish, kamaboko, meat, ham, sausage and cheese, and is selected to have the characteristics of not dissolving and disintegrating in water or salt solution.

By another feature thereof, the perforate mold or its contacting surface has a coating of an edible oil.

By yet another feature thereof, the mold is of any desired shape, e.g., preferably having a thickness less than 3 cm, with the proviso that such shapes permit the later removal of the solidified eggs product from the mold.

By yet another feature thereof, the mold is made of mesh whose size varies from 0.2 to 5 mm.

By still another feature of this invention the mold is formed of mesh, and is equipped with a mesh lid and a clamp, in order to apply moderate pressure, of, e.g., about 5 to about 10 g/cm$^2$, to the contents inside.

By a still further feature of this invention, the salt curing is conducted by brining the eggs and the food in the mesh mold in a saturated salt solution with occasional stirring, or by dry salting for about 1 to about 10 days at a suitable temperature of, e.g., about 2° C. to about 10° Cl; and subsequently removing the cured and solidified product from the mesh mold, within a period of about 2 to about 5 days.

By a still further feature of the invention, the cured and solidified product is fully immersed in over-saturated salt solution, or is dry salted to assure the salt saturation of the product; and the immersed or dry salted product is subsequently stored at a temperature of, e.g., between about −20° and 7° C., or between about −10° and −18° C., but not at temperatures below the eutectic point temperature of −21.1° C.

By yet another feature of the invention, small pieces of difficult-to-remove blood coagulations in the cleaned eggs are dissolved out by immersing the filled mesh mold in fresh water, or in a salt water solution having, e.g., a concentration of higher than about 5% w/w for about one to about two days at cold temperatures of, e.g., between about 2° and about 6° C., after filling the mold but before the salt curing.

By a still further feature of the invention, the herring eggs are singled-out from previously-frozen ovaries or from ovaries of previously-frozen herring.

By yet another feature of the invention, the singled-out herring eggs, which are fresh enough to be alive, are fertilized by means of immersing them in about 3.5% w/w salt solution or in clean sea water, where fresh sexually-matured herring milt is suspended, in order to increase the crunchiness of the eggs in the products.

By a feature of the solidified molded product of this invention, a salt-cured solidified molded layers or mixture is provided of herring eggs from sexually-matured herrings and solid food or foods selected from the group consisting of kelp, fish, shellfish, kamaboko, meat, ham, sausage and cheeses.

(iv) Generalized Description of the Invention

The present invention thus discloses a method which produces a novel type of "kazunoko" product including herring roe on kelp-like foods, even from herring ovaries of low grades, which facilitate new serving methods and enriches eating experience. The new type of "kazunoko" of the present invention can be processed from any herring ovaries, unless they are premature, which have previously been rejected for manufacturing conventional "shiokazunoko". Such rejected ovaries have the following characteristics: ovaries are broken or imperfect in shape; premature or over-mature; partially spent; blood-shot; and/or made of individual eggs which are less cohesive in binding, less crunchy in eating texture and/or small in size. In other words, the present invention discloses a method which produces herring roe on kelp-like foods matching the selected natural products from subspecies of Pacific herring in usefulness, even when the starting ingredient is the Atlantic herring roe of less high quality.

As compared to the prior art, the present invention is a simple method which possesses better processing controls and efficiency in terms of manufacturing a uniform and quality product at a high production rate. The product provided herein consists of only the same components as those of the natural product, without food binders or treating chemicals. Thus the novel products consist of herring roe, kelp, salt and water when "herring roe on kelp-like food" is prepared by the method of the present invention. The foremost usefulness of the present invention is that the method possesses a versatility to produce a variety of other novel reformed products, e.g., "cured herring roe with kamaboko", "cured herring roe on lobster meat" by using the binding ability of fresh herring eggs.

The present invention can use any kelp, e.g., one of Japanese dried products (Laminaria japonica) or one of the kelps (Laminaria saccharina) collected in the east coast maritime waters. In one processing technique, the fronds of harvested kelp are washed, trimmed of untidy portions and thin frill, air dried outdoors (e.g., like laundry) and stored in plastic bags until use. Alternatively, kelp can be salt-preserved until use. Dried kelp is moistened in water until it becomes flexible, and cut into rectangular sheets of 5 to 10 cm or ribbon of 5 to 10 cm in width or chopped in small pieces of 0.5 to 1.5 cm size. When kelp is slimy with polysaccharides, the surface of the fronds is wiped-off before use. If it is very slimy, it should not be used. The salt-preserved kelp is rinsed of excess salt before use. Commercial-dried or salt-preserved "wakame" (Undaria) can be used in the same manner as kelp.

To produce a variety of herring roe on foods or mixed foods, the present invention uses any solid food which is non-disintegratable in water or salt solution including "kamaboko" (heat processed "surimi" e.g., commercial mock crab legs), fresh, salted or cooked fish and shellfish, cooked chicken eggs, ham, sausage, cheese and cooked meat. The solid foods are sliced or chopped, preferably to about 2 to about 15 mm in thickness, or to about 5 to about 15 mm in size, and kept cold until use.

The present invention uses sexually-matured eggs, which may be from Pacific herring (Clupea harengus hallasi) or from its Atlantic counterpart (Clupea harengus harengus) as a main ingredient. However, the use of the Atlantic herring is economically advantageous because of its abundant supply and its lower prices. Since the individual eggs are used after breaking the membraneous sacs of the ovaries, the ovaries of broken sacs, or partially spent, over-mature or blood-shot ovaries which the conventional "kazunoko" process rejects can be used as well as the unbroken ovaries of perfect shape, unless it is premature.

DESCRIPTION OF PREFERRED EMBODIMENTS OF THE INVENTION

EXAMPLES

The following are typical Examples of the present invention.

Example 1

Herring should be handled at near-water-freezing temperatures by using slush ice from harvesting on-board to landing and sex-sorting at a plant. Ovaries are extracted from sexually matured female herring by slitting the bellies. The ovaries contain individual eggs in membraneous sacs which are to be broken to single out individual eggs. Manual or mechanical screening of the ovaries through a wire mesh (of 10 to 15 mm) is used to single out the eggs. This technique is a conventional one which is used for caviar manufacturing. The individual eggs are collected underneath the mesh directly into a container containing clean sea water, 3 to 4% w/w salt solution or fresh water at preferred temperatures of about 5° to about 15° C. Alternatively, the ovaries can be broken by mechanical agitation produced at reduced speeds using a conventional household food processor or using a STEPHAN UNC5™ laboratory processor. The breaking should be done in sea water, 3 to 4% w/w salt solution or fresh water. High speed agitation should be avoided because that will break the eggs.

The fertilized eggs become more turgid in appearance and crunchy in bite in comparison with unfertilized eggs after salt curing. For the optional step of using the fertilized eggs in the present invention, milt from freshly harvested, sexually-matured male herring is stripped into sea water or 3.5% w/w salt solution until it becomes slightly cloudy. This milt solution is used for breaking the ovary sacs to the individual eggs instead of fresh water or the salt solution in the process previously described. The mixture of the eggs and the milt is allowed to stand for 15 to 30 minutes at temperatures of about 5° to about 15° C. until the eggs start aggregating. The eggs and the milt can fertilize up to several hours after the herring is removed from water and kept cold. Such fertilized eggs then proceed to the next rinsing stage, where they are rinsed with sea water or with 3.5% w/w salt solution, but not with fresh water.

The singled-out individual eggs, either fertilized or unfertilized, are contaminated with broken pieces of the membrane, scales and dissolved and coagulated blood. To remove such contaminants and to clean the eggs, they are rinsed in sea water, 3 to 4% w/w salt solution or fresh water at preferred temperatures between 5° and 15° C. The rinsed water is decanted to remove the dissolved blood and membrane pieces from the ovaries. The residual pieces of coagulated blood, scales and ovarian membrane are manually removed. Most of blood coagulations smaller than 1 to 1.5 mm which may remain in the eggs, dissolve in fresh water or higher than about 5% w/w salt solution in the optional process described hereinafter. When the eggs are rinsed and cleaned by using fresh water, they become cohesive too quickly so that the eggs have to proceed to the next stage of the molding process without delay. Whenever the eggs become a cohesive mass, and the mass is broken back into individual eggs, those eggs lose considerable bindability.

The mold being used in the practice of this invention is preferably made of synthetic plastic material, e.g., polyethylene, polypropylene, etc. At least the contacting surfaces to the eggs may be smeared with edible oil. The eggs do not adhere to hydrophobic surfaces as much as to stainless steel surfaces. Therefore, the solidified mass of the eggs can be removed easily from the mold later. The mold can be of any desired shape, e.g., a shape of fish, as long as the shape permits the solidified product to be removed freely from the mold without breaking. However, the thickness of the molds is preferred to be less than 3 cm, otherwise the next stage of the curing process would be prolonged unreasonably. In practice, the mold shape can be a tray shape, for instance, of inside dimension 32 cm by 32 cm and 2.3 cm height to produce a slab of such shaped product.

The mold is made of a mesh whose size varies from 0.5 to 10 mm, preferably from 0.5 to 3 mm. The size of herring eggs are smaller than 2 mm, but the cohesiveness of the eggs usually prevents them from sieving through the mesh. The mold is equipped with a mesh lid and clamp or rubber band which applies moderate pressure at 5 to 10, e.g., 7 $g/cm^2$ to the eggs and food inside the mold. The pressure facilitates the solidification of the contents in the mold to produce the firmly bound product. The mold can be of non-mesh and open tray-shape without a lid, but the open tray mold does not produce the firmly bound products which the present invention intends to provide.

The cleaned eggs with some rinsing solution left are poured into a mesh mold of tray-shape, as described above, and spread evenly partially to fill the mold e.g., half full. The excess solution drains through the mesh. To sandwich kelp between the layers of eggs, the fronds or cut sheets of pre-prepared kelp are spread on the eggs without overlapping. Then, cleaned eggs are poured and spread again over the spread kelp. The mold is then filled flush to the top with the eggs, covered with the mesh lid and cramped to press the eggs and the kelp inside the mold for producing a "herring roe on kelp-like food" after the next curing process. When two layers of kelp are placed between the eggs, "herring roe on double kelp food" can be produced. When the mixture of the chopped kelp and the eggs is spread between the layers of eggs, "herring roe on chopped kelp" can be produced.

In preparation for other varieties of the herring roe on foods or herring roe mixed foods, the kelp can be replaced and/or mixed with thin or small pieces of any solid foods which are non-disintegratable in water. For instance, when the kelp is replaced by sliced or chopped "kamaboko", "herring roe on/with kamaboko" can be produced after the curing process. When chopped "wakame" is mixed with the herring eggs, and the mixture is then stuffed in a mold of fish-shape, a cured herring roe mixed with "wakame" of fish-shape can be produced. When chopped pieces of ham or cheese is mixed in the eggs, the eggs do not adhere well to those pieces during salt curing, but the pieces stay embedded inside the solidified egg matrix without coming apart. When herring eggs alone are filled in a mold without layering with or mixing the other solid foods, of course, a plain cured herring roe product, i.e., a plain reformed "kazunoko", can be prepared.

The cleaned herring eggs within the molds may still contain blood coagulations of a size which is smaller than 1 to 1.5 mm. Since blood cells rupture in fresh water or shrink in high salt solution by osmotic pressure, and since the blood diffuses from the coagulations, the molds which have been filled with the eggs may be optionally immersed in running fresh water, or salt solution of higher than about 5% w/w for 1 to 2 days at a cold temperature of about 2° to about 6° C., before the next stage of the curing process in order to obtain products without blood spots.

In the next processing step, the filled mold is immersed in saturated fishery salt solution for 1 to 10 days depending on the thickness of products, usually for 2 to 5 days for most products, with occasional stirring at preferred temperatures of from about 2° to about 10° C. Since the filled mold is buoyant in the salt solution, suitable means, e.g., a weight, racks or any other device, should be used to prevent the mold from floating. The individual eggs cohere to themselves as well as adhering to kelp or other solid foods and become a solidified mass during the salt curing. As soon as the eggs are cured and solidified thoroughly, the product can be removed from the mold without breaking it. When the product is still not solidified, the brine immersion should be extended for additional days. The cleaned herring eggs of normal maturity gain by 20 to 25% additional weight through the brining process by salting in. To store the products as detailed later after removing from the molds, the cured and solidified product is immersed fully again in over-saturated salt solution assured by extra salt addition.

A conventional dry salting or semi-dry salting method can optionally be employed to produce products of firmer texture and brownish colour according to the teachings of the present invention. In the case of semi-dry salting, the herring eggs and solid foods in a mesh mold are dry-salted in a container for several days. Then the product is allowed to be immersed in the dripped water from the eggs in the container. The solidified product is removed from the mold and further dry-salted or immersed in over-saturated brine for storage.

The cured, solidified product is immersed in an over-saturated brine, or is dry salted for storing at temperatures of about 2° to about 7° C. Extra salt should be added to the brine or be used completely to cover the dry product to assure the salt saturation in the products. Also, care should be taken to assure that the cured products are submerged fully in the brine to retard oxidation (browning) of the products. When the storage is prolonged, it is advisable to store the cured products at temperatures between about −12° and about −18° C., but never below the eutectic point temperature of about −21.1° C. The lower the storage temperature, the more desirable the texture can remain as enzymatic activities slow down in the products.

To prepare for serving, the salt cured products are desalted in cold fresh water until the salty taste becomes slight or non-existing. When the shape of product is large as a slab, for instance, the product can be sliced in a suitable thickness and used in preparing sushi (a Japanese rice food) or hors d'oeuvres. Other uses of the desalted products will be for preparing a variety of seasoned kazunokos by marinating with soy sauce, hot chili, pepper, mayonnaise, sake-lees and/or Japanese horseradish.

Example 2

Kelp collected on the coast of the northern Canadian Maritime Provinces was washed and air dried or salt preserved. Before use, the kelp was moistened or washed in water, then the untidy portions and frills were trimmed off and the kelp was cut into sheets or ribbons of 4 to 10 cm width. Water cooked lobster was shucked, the meat was cut in pieces of 5 to 15 mm size and kept in refrigerator until use.

Herring was caught by gillnet at Fisherman's Bank in the southern Gulf of St. Lawrence, Canada, landed, sex-sorted and gutted to extract the matured ovaries. Care was taken not to collect scales and other contaminants with the ovaries. All the extraction was done within 5 to 7 hours after the herring was removed from the water.

1 kg of the extracted ovaries and 1 liter of water were placed in the processing bowl of a processor known by the trademark STEPHAN UNC5™, and underwent slow agitation at #3 of the variable speed control for 20 seconds to break the ovarian sacs, but not break the individual eggs. After the breaking, the whole content was transferred into a 10 liter container, another 4 liter of water was added. The contaminants in the singled-out eggs, e.g., dissolved blood and the pieces of blood coagulation and broken membrane, are removed by water addition, stirring, decanting and manual picking with tweezers and a pointed small spoon.

The rinsed and cleaned eggs with some water were poured and spread evenly in a plastic mesh mold of tray-shape until it was half filled. The mold had an inside dimension of 32 cm by 32 cm and 2.3 cm height, and also having a liner of plastic (e.g., nylon or polyethylene) mosquito net of 1.5 mm mesh. The contacting surfaces to the eggs were coated with an edible oil for easy later removal of the cured product from the mold. The sheets of kelp were laid over the spread eggs in the mold without overlapping the kelp sheets, or with 2 to 5 mm spacing between the sheets. Then, the eggs were spread again on top of the spread kelp to sandwich the kelp between eggs layers for preparing "herring roe on kelp-like food". The mold, which was filled flush to the top, was covered by a plastic lid having the same mesh liner inside as described above, and was clamped with rubber bands to press the content moderately. To prepare "herring roe on lobster" instead, the kelp was replaced by the pieces of pre-prepared lobster meat during filling in the mold.

The filled mesh mold was kept in a tank through which running cold tap water was flowing overnight to remove the spots of blood coagulation left in the eggs, and was then immersed in a container of saturated fishery salt solution by placing a weight on top to prevent it from floating. The container was stored at 2° to 4° C. for 3 days and the salt solution was stirred once a day. After 3 days, a solidified slab of cured herring eggs and kelp or lobster meat was removed from the mold and was cut in six pieces. For storage, the cut cured product was immersed fully in saturated salt solution and some extra salt was added to assure the saturation. The storing temperature ranged between −2° to −8° C. The cured product was desalted by soaking in cold water and cut or sliced for further serving preparations.

The processing yield of the example above was approximately as follows: 5 kg of the female herring provided 1 kg of the extracted ovaries; 1 kg of the ovaries produced 1 kg of the cured eggs in the finished product, excluding the weight of added kelp or lobster meat, through losing the weight of the ovarian membrane and dissolved blood, but gaining the weight of absorbed salt water during the process.

Thus, the present invention utilizes the intrinsic binding ability of sexually-matured herring eggs, i.e., their cohesiveness and adhesiveness, to prepare a variety of novel cured herring roe mixed foods by means of the novel processing which has been built on good understanding of the property of the eggs. The binding ability prominently appears when the eggs are fertilized or contacted with fresh water or higher salt solutions than the sea water. As well, the binding property is strong when the eggs are fresh and it decreases as the eggs become less fresh or are stored frozen. However, the previously frozen eggs are still cohesive/adhesive enough to prepare most of the products of the present invention.

COMPARISON

There are advantages and differences to the present invention over the previously-described U.S. Pat. No. 4,181,739.

(1) The present invention provides herring roe mixed foods like "herring roe on kelp" while the prior U.S. Pat. No. 4,181,739 provided only to reformed "kazunoko".

(2) The present invention employs a simple one step curing process while the prior U.S. Pat. No. 4,181,739 goes through several cumbersome steps of curing to make the texture extra firm and crunchy. The gradual increase of salt concentration in such prior U.S. patent is an attempt to avoid rupturing the egg cells by gradually increasing the osmotic pressure of salt to the eggs. Consequently, the product is to hold a firm and crunchy texture. However, no significant amount of ruptured eggs have not been noticed during the process of the present invention involving one-step curing. Besides, such degree of firmness and crunchiness seen in conventional "kazunoko" is not required in the product of the present invention. Such degree of firmness and crunchiness is not required for most food application. The present invention produces a texture which is firm and crunchy enough to be acceptable to be served on "sushi" and other food preparations.

(3) The present invention uses a mesh mold which allows the salt curing solution to penetrate the product freely. The prior U.S. Pat. No. 4,181,739 uses a stainless steel container which does not allow the salt to penetrate the product through the bottom and the sides. Consequently, in the prior U.S. Pat. No. 4,181,739, the mass of herring eggs has to be removed from the first container just after soaking in the initial solution in order to cure the product completely and effectively.

(4) The mesh mold of the present invention is equipped with a mesh lid which facilitates the binding and solidification of the eggs to produce firmly fixed products by applying moderate pressure to the content during the curing process. No such pressure is applied to the contents of the prior U.S. Pat. No. 4,181,739.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A process for preparing reformed and cured herring roe mixed foods from eggs derived from herring ovaries, salt, water and a solid food, which process comprises:

filling a perforate mold with sexually-matured herring eggs and with pieces of said solid food by placing the solid food on top of a first layer of said herring eggs in said mold and then placing a second layer of said herring eggs on the solid food to form a sandwich structure in said mold; and subsequently salt curing said sandwich structure of herring eggs and solid food while subjecting the sandwich structure to mechanical pressure to bind the herring eggs together and to provide a salt-cured product; and allowing said salt-cured product to solidify in said perforate mold.

2. The process of claim 1 wherein said herring eggs are individual eggs singled-out from the ovarian sacs of sexually-matured female herring.

3. The process of claim 2 wherein said individual eggs are rinsed in at least one of sea water, salt water solution and fresh water at suitable temperature.

4. The process of claim 3 wherein said salt water solution has a concentration of about 3 to 4% w/w salt.

5. The process of claim 3 wherein said suitable temperature is between about 5° C. and about 15° C.

6. The process of claim 3 wherein said at least one of sea water, salt water solution and fresh water is decanted after rinsing of the eggs in order to remove blood, ovarian membranes and contaminants from the ovaries; and wherein any blood, ovarian membranes and contaminants still left are removed to obtain cleaned eggs.

7. The process of claim 6 wherein any blood left in said cleaned eggs is dissolved out by immersing said filled perforate mold in fresh water, or in salt water solution having a concentration of higher than about 5% w/w, for about one to about two days at temperatures of between about 2° and about 6° C., before said salt curing.

8. The process of claim 2 wherein said herring eggs are singled-out from previously-frozen ovaries or from ovaries of previously-frozen herring.

9. The process of claim 2 wherein said singled-out herring eggs are fresh enough to be alive and are fertilized by immersing them in about 3.5% w/w salt solution or in clean sea water where sexually-matured fresh herring milt is suspended, in order to increase the crunchiness of said eggs in said product.

10. The process of claim 1 wherein said solid food is selected from the group consisting of processed or unprocessed kelp, shellfish, fish, kamaboko, meat, ham, sausage and cheese, and wherein said solid food does not dissolve or disintegrate in water or in salt solution.

11. The process of claim 10 wherein said kelp is Laminaria japonica or Laminaria saccharina.

12. The process of claim 1 wherein said perforate mold is a mesh mold and wherein said mesh mold or its contacting surface has a coating of edible oil thereon and is of any desired shape having less than about 3 cm thickness, with the proviso that such shape permits free removal of solidified egg product from said mold.

13. The process of claim 1 wherein said perforate mold is made of mesh whose size varies from about 0.2 to about 5 mm.

14. The process of claim 13 wherein said perforate mold is made of mesh whose size varies from about 0.5 to about 2 mm.

15. The process of claim 1 wherein said perforate mold is equipped with a mesh lid and a clamp in order to apply moderate pressure of about 5 to about 10 g/cm$^2$ to the contents inside.

16. The process of claim 1 wherein said salt curing is conducted by brining said eggs and said food in said perforate mold in a substantially saturated salt solution with occasional stirring or by dry salting or about 1 to about 10 days at a suitable temperature of about 2° C. to about 10° C.; and subsequently removing said cured and solidified product from said mold within a period of about 2 to about 5 days.

17. The process of claim 16 wherein said cured and solidified product is fully immersed in super saturated salt solution, or is dry salted to assure the salt saturation of the product; wherein said immersed or dry salted product is subsequently stored at a temperature of between about −20° and 7° C.

18. The process of claim 17 wherein said immersed or dry salted product is subsequently stored at a temperature of between about −10° and −18° C.

* * * * *

UNITED STATES PATENT AND TRADEMARK OFFICE
CERTIFICATE OF CORRECTION

PATENT NO. : 5,510,133
DATED : April 23, 1996
INVENTOR(S) : Shoji YAMAMOTO

It is certified that error appears in the above-indentified patent and that said Letters Patent is hereby corrected as shown below:

Column 12 (Claim 6), line 17, after "wherein" delete "said"

Column 12 (Claim 16), line 64, change "or" to -- for --

Column 13 (Claim 17), line 4, before "wherein" insert -- and --

Signed and Sealed this

Third Day of September, 1996

Attest:

BRUCE LEHMAN

Attesting Officer

Commissioner of Patents and Trademarks